United States Patent
White (10) Patent No.: US 9,473,901 B1
(45) Date of Patent: Oct. 18, 2016

(54) PRECISE LOCATION AND PROJECTION BY RADIO BEACON SIGNALS

(71) Applicant: NCR Corporation, Duluth, GA (US)

(72) Inventor: Joseph Arnold White, Suwanee, GA (US)

(73) Assignee: NCR CORPORATION, Duluth, GA (US)

( * ) Notice: Subject to any disclaimer, the term of this patent is extended or adjusted under 35 U.S.C. 154(b) by 0 days.

(21) Appl. No.: 14/810,911

(22) Filed: Jul. 28, 2015

(51) Int. Cl.
*H04W 4/04* (2009.01)
*H04W 4/02* (2009.01)
*H04W 16/28* (2009.01)
*H04W 4/00* (2009.01)

(52) U.S. Cl.
CPC ............ *H04W 4/043* (2013.01); *H04W 4/008* (2013.01); *H04W 4/023* (2013.01); *H04W 16/28* (2013.01)

(58) Field of Classification Search
CPC ..... H04W 4/008; H04W 4/021; H04W 4/02; H04W 4/028; H04W 4/043; H04W 64/00; H04W 4/025; H04W 4/04; H04W 64/006; H04W 84/12; H04W 4/027
See application file for complete search history.

(56) References Cited

U.S. PATENT DOCUMENTS

| 2014/0365488 | A1* | 12/2014 | Arslan | G01S 5/0242 707/736 |
| 2015/0119071 | A1* | 4/2015 | Basha | H04W 64/00 455/456.1 |
| 2016/0100282 | A1* | 4/2016 | Pounds | H04W 4/008 455/456.1 |

* cited by examiner

*Primary Examiner* — Nam Huynh
(74) *Attorney, Agent, or Firm* — Schwegman, Lundberg & Woessner (57) ABSTRACT

Various embodiments herein each include at least one of systems, methods, software, and devices for precise location and projection by radio beacon signals. One such embodiment, in the form of a method that may be performed in whole on a mobile device or on a mobile device in communication with a server based system. The method includes iteratively determining an unfiltered location. The unfiltered location is determined based on at least three received beacon signals and beacon location data retrieved from a database for the beacons from which the beacon signals were received. The method then applies a triangulation algorithm to the beacon location data. The method may continue in some embodiments by then determining a filtered location based on recent unfiltered locations while disregarding unfiltered locations determined to be bad signals. A path may then be projected based on filtered and unfiltered locations.

19 Claims, 5 Drawing Sheets

PRECISE LOCATION AND PROJECTION BY RADIO BEACON SIGNALS

BACKGROUND INFORMATION

Location determination of mobile devices, such as smartphones, tablets, and other such devices has become commonplace via use of Global Positioning System (GPS) usage and radio beacon devices such as BLUETOOTH® beacons and wireless access points (WAP) deployed to known locations that communicate with mobile devices. However, GPS signals are generally not useful while indoors and locations determined from BLUETOOTH® beacon and WAP signals do not provide precise locations as these are proximity-based location detection solutions. Such proximity based location detection solutions typically provide a location within proximity of 30 feet at best. While 30-foot precision may be sufficient in some deployments, other solutions are limited in usefulness by not having greater precision in location determination.

SUMMARY

Various embodiments herein each include at least one of systems, methods, software, and devices for precise location and projection by radio beacon signals. One such embodiment, in the form of a method that may be performed in whole on a mobile device or on a mobile device in communication with a server based system. The method includes iteratively determining an unfiltered location. The unfiltered location is determined based on at least three received beacon signals and beacon location data retrieved from a database for the beacons from which the beacon signals were received. The method then applies a triangulation algorithm to the beacon location data.

Such embodiments may further include iteratively determining a filtered location by calculating a location average and standard deviation from at least three most recently determined unfiltered locations. Determining a filtered location further includes applying the triangulation algorithm to at least three most recently determined unfiltered locations that are less than the standard deviation from the location average.

Some additional embodiments may then iteratively generate a path prediction. Iteratively generating a path predication in some embodiments is performed through application of a Kalman filter algorithm to a plurality of most recently determined unfiltered locations. This determines a path having a velocity and a direction over a path period equal in duration to a period over which the plurality of most recently determined unfiltered locations were determined. Iteratively generating a path prediction further includes calculation of a distance variance from the path by the plurality of most recently determined unfiltered locations. The path prediction is then calculated in the shape of a cone starting a distance behind a most recent filtered location and extending in the direction of the determined path for distance equal to a number of path periods multiplied by the velocity. The cone is defined with a width at the end of each path period equal to the distance variance multiplied by a number of elapsed path periods.

DETAILED DESCRIPTION

Various embodiments herein each include at least one of systems, methods, software, and devices for precise location and projection by radio beacon signals. Some such embodiments are targeted at indoor locations and other locations where GPS solutions are not effective, although the various embodiments herein may be deployed in locations where GPS is effective.

One embodiment may be deployed in a retail facility. The deployment may include a plurality of positioning devices. Positioning devices, in some embodiments, may include a radio transceiver device, such as a Bluetooth® beacon device. Such beacon devices as are available from NCR Corporation of Duluth, Ga. among other manufacturers. The positioning system devices may also, or alternatively, include Wi-Fi® WAP devices in some embodiments. Regardless of the positioning device type, the signal includes a positioning device identifier that is registered in a database in association with a geographic location identifier, such as latitude and longitude coordinates of a location where the positioning device is deployed.

Further in such embodiments, a retail facility customer carrying a mobile device, such as a smartphone, approaches and enters the retail facility and the mobile device begins receiving signals from the positioning devices. An app that executes on the mobile device receives the signals. The received signals include a signal strength and the identifier of the broadcasting positioning device, which are recorded by the mobile device app. The mobile device may then retrieve the geographic location data stored in the database associated with the positioning device and determine a location based thereon. The database may be local to the mobile device or located on a server accessible via a network, such as the Internet. The mobile device app may instead transmit the positioning device data to a server that will then process the data to identify a location of the mobile device and transmit the location data back to mobile device. The mobile device may then plot the location on a map presented by the mobile device app on a display of the mobile device. A projected path of the customer may also be determined, either by the mobile device app or by a process that executes on the server. The path may be presented on the mobile device app in some embodiments. In some embodiments, the projected path may be utilized by the mobile device app or the server to identify products within the retail facility that intersect with or are near the projected path that are or may be of interest to the customer. Products that are identified may be identified base on an identity of the customer registered to the mobile device and an account of the customer with an account with the operator of the retail facility.

These and other embodiments are described herein with reference to the figures. In particular, various embodiments of location determination and path projection are provided.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
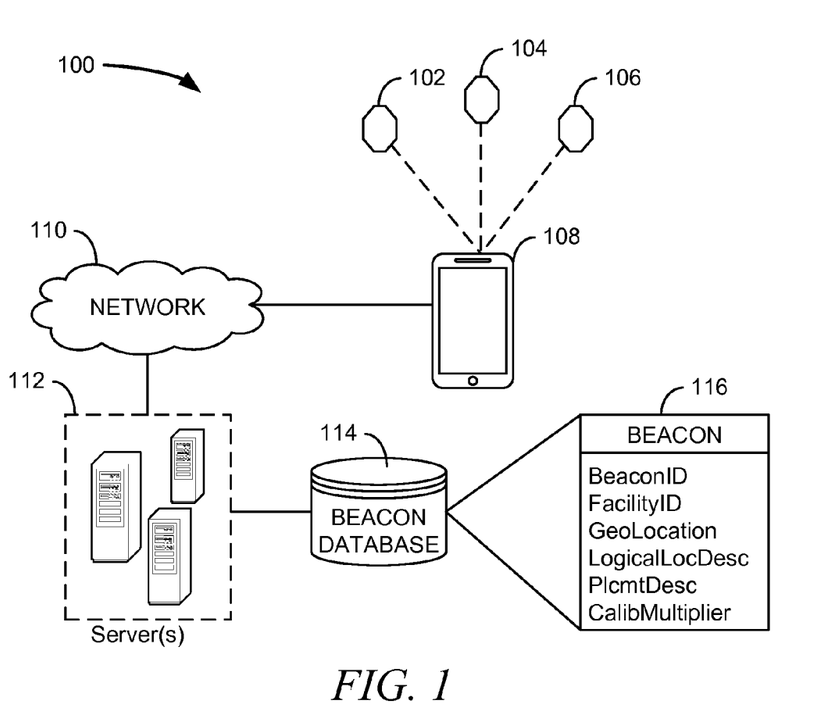
FIG. 1 is a logical block diagram of a system, according to an example embodiment.

FIG. 1 is a logical block diagram of a system 100, according to an example embodiment. The system 100 includes a plurality of beacon devices 102, 104, 106, such as BLUETOOTH® beacon devices, that are deployed in a facility. The system 100 further includes a mobile device 108 that connects wirelessly to a network 110, such as the Internet. Also connected to the network 110 are one or more servers 112. The one or more servers 112 are also connected to or house a beacon database 114. The beacon database 116 stores beacon-related data that includes a BEACON table 116.

The BEACON table 116, as illustrated according to an example embodiment, includes data with regard to a plurality of beacon devices deployed to one or a plurality of facilities. The data may include a unique beacon identifier (BeaconID) that is included in radio signals broadcast by a beacon device, a facility identifier (FacilityID), and a precise geographic location (GeoLocation) where the respective beacon device is deployed, which may be expressed in latitude and longitude coordinates. The data of the BEACON table 116 may further include a logical location description (LogicalLocDesc) that may provide a simple description of the location where the respective beacon device is deployed, such as "aisle 4". The data of the BEACON table 116 may also include a placement description (PlcmtDesc) that provides detail of where the respective beacon device is deployed, such as "aisle 4, above the middle shelving system." Some embodiments of the BEACON table 116 and the system 100 further include a calibration multiplier (CalibMultiplier). A calibration multiplier may be included to apply to a signal received from the respective beacon device when the signal is received within the deployed environment that is either too weak or too strong due to environmental factors. The calibration multiplier, in some embodiments, is determined as part of a calibration process performed after the beacon devices 102, 104, 106 are deployed and then stored in the BEACON table 116. A calibration multiplier may be a value greater than zero that is applied to a signal strength to modify the signal strength when utilized to determine a location of the mobile device 108. To decrease a signal strength, the calibration multiplier value is great than zero and less than one. To increase a signal strength, the calibration multiplier value is greater than one. If the signal strength does not need to be modified, the calibration multiplier value may be NULL, zero, or one, depending on the particular embodiment.

The mobile device 108 includes an app that executes thereon. The mobile device 108 includes at least one transceiver device, which typically includes WI-FI® and BLUETOOTH® transceiver devices. At least one of the transceiver devices receives radio signals broadcast by the beacon devices 102, 104, 106. As mentioned above, the received radio signals include a signal strength, which may be determined on the mobile device 108 based on an attenuation of the received radio signals, and the radio signals include a beacon device identifier of the beacon device 102, 104, 106 that broadcast the respective radio signal. The mobile device 108 app, upon receipt of a plurality of beacon 102, 104, 106 signals, such as at least three signals in some embodiments, determines a location of the mobile device 108. The location may be determined by processing on the mobile device 108, processing offloaded to one or more server 112 processes, or a combination of the two. The processing may further include determination and projection of a path the customer carrying the mobile device has traveled and will travel if continuing on the same path. Further details of how the location and path are determined are provided with regard to various embodiments in FIG. 2, FIG. 3, and FIG. 4 and the descriptions thereof.

Figure 2:
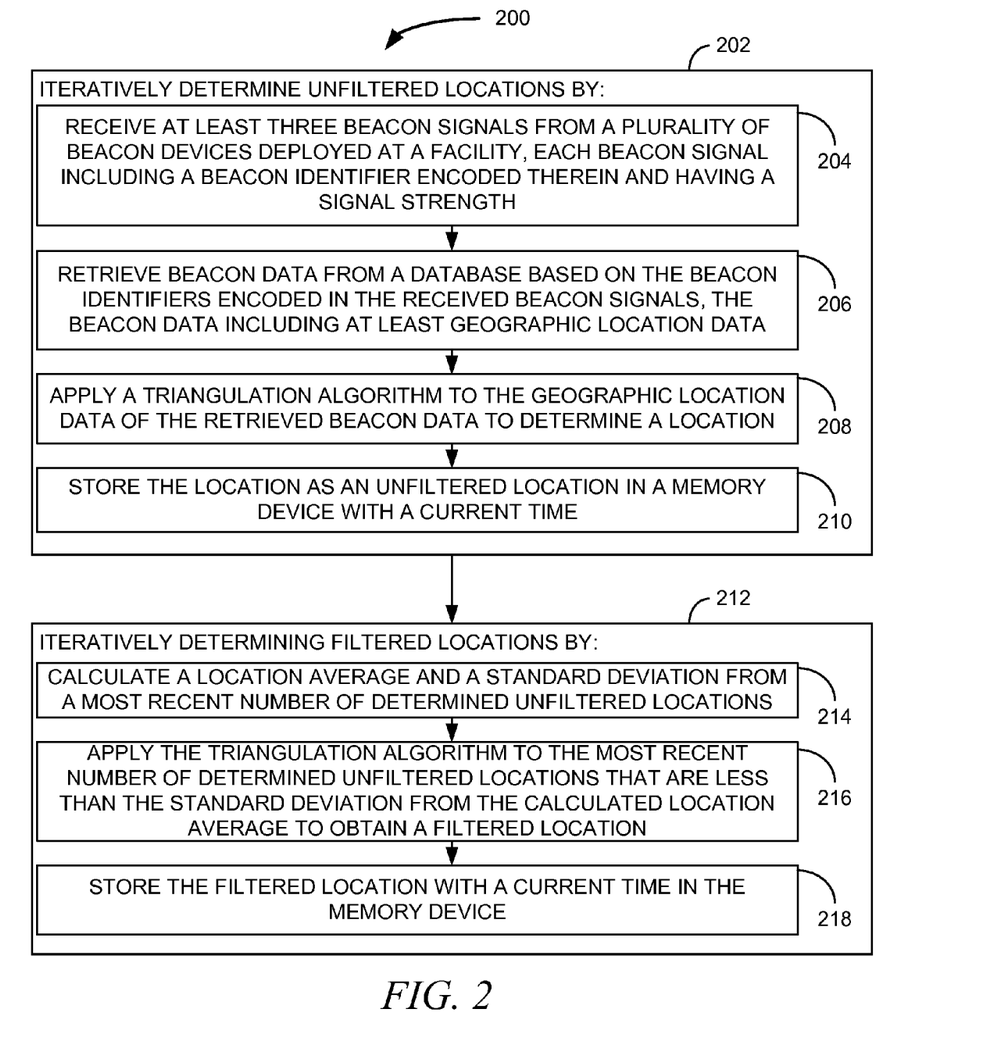
FIG. 2 is a block flow diagram of a method, according to an example embodiment.

FIG. 2 is a block flow diagram of a method 200, according to an example embodiment. The method 200 is an example of a method that may be performed to determine a location on a mobile device, on a server in communication with a mobile device, or a combination of both. The method 200 includes iteratively determining 202 unfiltered locations and iteratively determining 212 filtered locations.

In some embodiments of the method 200, iteratively determining 202 unfiltered locations includes receiving 204 at least three beacon signals from a plurality of beacon devices deployed at a facility. Each received beacon signal includes a beacon identifier encoded therein and has a signal strength. Determining 202 unfiltered locations further includes retrieving 206 beacon data from a database based on the beacon identifiers encoded in the received beacon signals. The retrieved beacon data includes at least geographic location data. Next, the method 200 in determining 202 unfiltered locations applies 208 a triangulation algorithm to the geographic location data of the retrieved beacon data to determine a location and stores 210 the location as an unfiltered location in a memory device with a current time. Determining 202 unfiltered locations may then be performed again with regard to newly received 204 beacon signals.

In some embodiments of the method 200, retrieving 206 the beacon data further includes retrieving a beacon signal calibration multiplier from the database for each of the plurality of beacon devices from which beacon signals were received when a beacon signal calibration multiplier is present for a respective beacon device. The method 200 in such embodiments then applies the beacon calibration multipliers to respective beacon signal strengths.

The method 200 also continues by iteratively determining 212 filtered locations. Determining 212 filtered locations, in some embodiments, includes calculating 214 a location average and a standard deviation from a most recent number of determined 202 unfiltered locations, such as four most recently determined 202 unfiltered locations. The method 200 in determining 212 filtered locations may then apply 216 the triangulation algorithm to the most recent number of determined 202 unfiltered locations that are less than the standard deviation from the calculated 214 location average to obtain a filtered location. The filtered location may then be stored 218 with a current time in the memory device. The iterative determination may then iterate and determine 212 a next filtered location upon determination 202 of another unfiltered location.

Figure 3:
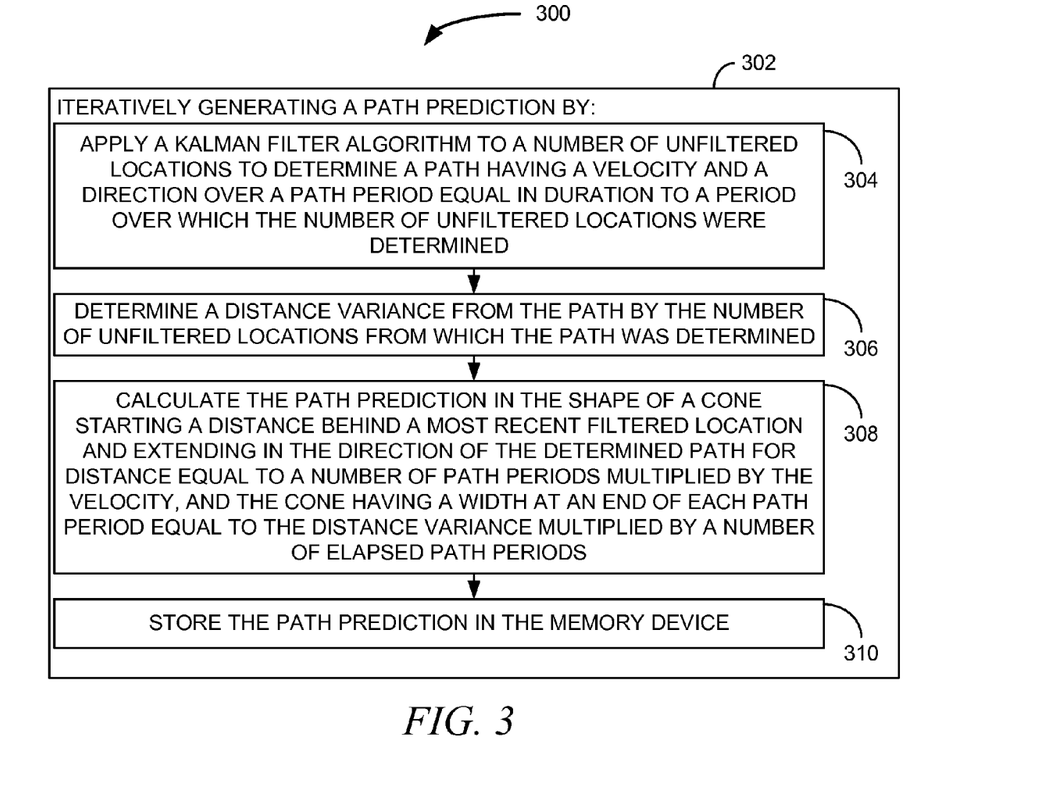
FIG. 3 is a block flow diagram of a method, according to an example embodiment.

In some embodiments, the method 200 may also continue to the method 300 to generate 302 a path prediction. The method 300 includes iteratively generating 302 a path prediction by applying 304 a Kalman filter algorithm to a number of unfiltered locations, such as four, to determine a path having a velocity and a direction over a path period equal in duration to a period over which the number of unfiltered locations were determined. The method 300 may then determine 306 a distance variance from the path by the number of unfiltered locations from which the path was determined. The path prediction may then be calculated 308 in the shape of a cone, or other shape such as an oval, polygon, or other shape in various embodiments, starting a distance behind a most recent filtered location, such as three feet, and extending in the direction of the determined path. The cone, or other shape extends for distance equal to a number of path periods multiplied by the velocity. The cone, or other shape has a width at an end of each path period equal to the distance variance multiplied by a number of elapsed path periods. The path prediction may then be stored 310 in the memory device, such as a memory device of the computing device performing the methods 200 and 300. When the methods 200 and 300 are performed in whole or in part on a server, the determined 212 filtered locations and generated 302 path prediction may also be transmitted to the mobile device. The mobile device may then update one or both of a current position plotted on a presented map of the facility where the beacon device are deployed and present the generated 302 path projection.

Returning to the method 200 of FIG. 2, the method 200 in some embodiments further includes a server determining the mobile device is present at a facility based on data representative of a beacon signal received via a network from the mobile device. Such embodiments may then retrieve beacon data from the database with regard to all beacons associated with a facility identifier included in a row of data in the database of associated with a beacon identifier included in the data representative of a beacon signal received from the mobile device. A facility map associated with the facility identifier may then be retrieved and transmitted to the mobile device along the retrieved beacon data. The facility map typically includes geographic location metadata corresponding to geographic location data of filtered and unfiltered locations as well as generated 302 path projections. Based on this data, the mobile device can not only present the map and plot current locations thereon, but can also calculate and update position data when connectivity with the server is lost based on newly received beacon signals.

Figure 4:
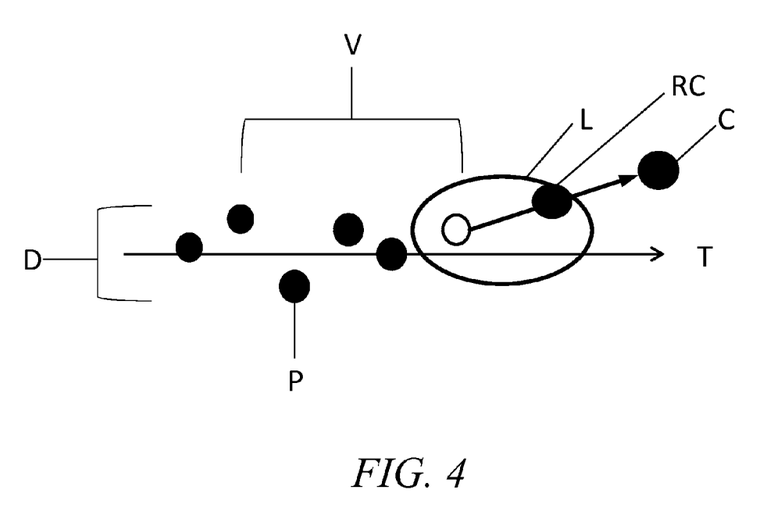
FIG. 4 is a location plot diagram and path projection illustration, according to an example embodiment.

FIG. 4 is a location plot diagram and path projection illustration, according to an example embodiment. The illustration provides an illustration of how an path projection is calculated and how a currently location is determined by a mobile device app when the mobile device app has a path projection but has lost connectivity with a server that calculated the path projection or is between path projection updates that may be received periodically.

The illustration of FIG. 4 includes a number of points P represented by closed black circles that are previously determined locations and an open circle that is a current location. The previously determined locations and current location are not in a straight line as they represent a meandering path of a customer through a facility. A Kalman filter algorithm is applied to the previously determined locations and current location to determine a velocity V and a direction of a path T over a period equal in duration to a period over which the previously determined locations and current location were determined. An average deviation D, or variance, from the determined path T is then determined as illustrated by bracket D. The path prediction is then determined in a shape, such as an oval as illustrated in FIG. 4, beginning behind the current location and extending a distance in the direction of the path T for a distance at least equal to a distance covered during a next period equal in duration to a period over which the previously determined locations and current location were determined. A maximum width of the shape at the end of the distance is equal to the average deviation D. If the shape is extended a distance equal to two of such periods, the maximum width of the shape will be two times the average deviation.

Figure 5:
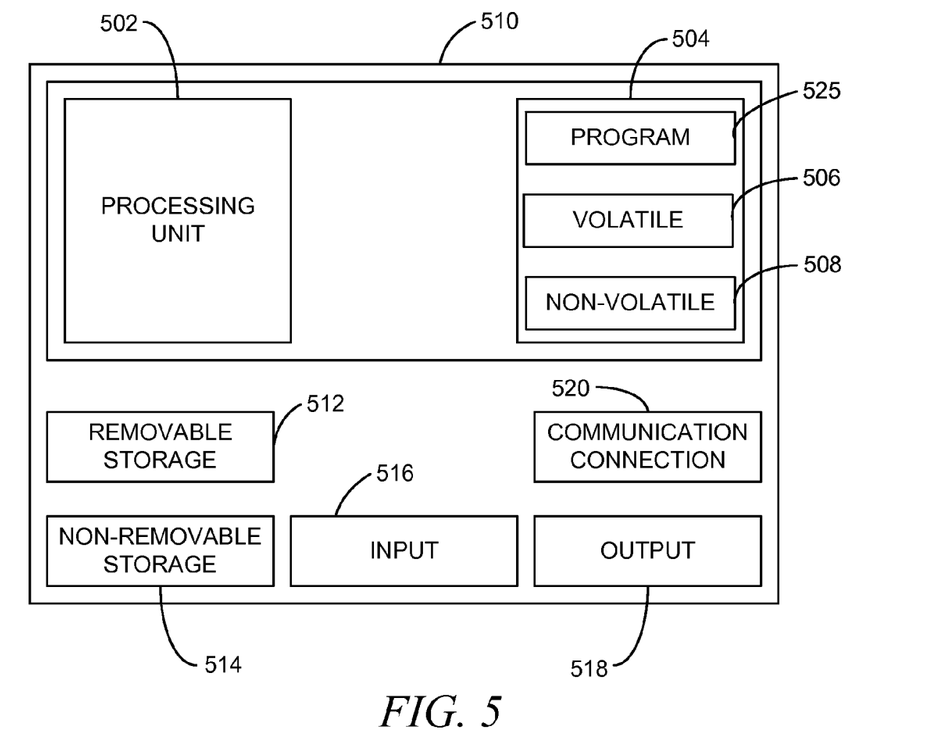
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed by a mobile device comprising:
   iteratively determining an unfiltered location based on at least three received beacon signals from a plurality of beacon devices deployed at a facility, beacon location data retrieved from a database for the beacons from which the beacon signals were received, and application of a triangulation algorithm to the beacon location data;
   iteratively determining a filtered location by calculating a location average and standard deviation from at least three most recently determined unfiltered locations and applying the triangulation algorithm to at least three most recently determined unfiltered locations that are less than the standard deviation from the location average; and
   iteratively generating a path predication through application of a Kalman filter algorithm to a plurality of most recently determined unfiltered locations to determine a path having a velocity and a direction over a path period equal in duration to a period over which the plurality of most recently determined unfiltered locations were determined, calculation of a distance variance from the path by the plurality of most recently determined unfiltered locations, and calculation of the path prediction in the shape of a cone starting a distance behind a most recent filtered location and extending in the direction of the determined path for distance equal to a number of path periods multiplied by the velocity, and the cone having a width at the end of each path period equal to the distance variance multiplied by a number of elapsed path periods.

2. The method of claim 1, wherein the beacon signals originate from BLUETOOTH beacon devices.

3. The method of claim 2, wherein retrieving the beacon data further includes retrieving a beacon signal calibration multiplier from the database for each of the plurality of beacon devices from which beacon signals were received when a beacon signal calibration multiplier is present for a respective beacon device, and applying the beacon calibration multipliers to respective beacon signal strengths.

4. The method of claim 3, wherein the plurality of beacon signals are received from a mobile device as data representative of actual beacon signals received by the mobile device from the BLUETOOTH beacon devices, the method further comprising:
   transmitting at least one of the determined filtered locations and path predictions to the mobile device.

5. The method of claim 4, further comprising:
   determining the mobile device is present at a facility based on data representative of a beacon signal received via a network from the mobile device;
   retrieving beacon data from the database with regard to at least some beacons associated with a facility identifier stored in the database in association with a beacon identifier included in the data representative of a beacon signal received from the mobile device;
   retrieving a facility map associated with the facility identifier, the facility map including geographic location metadata corresponding to geographic location data of filtered and unfiltered locations to enable the mobile device to plot a locations of filtered locations and path predictions within a graphical rendering of the facility map on the mobile device; and
   transmitting the retrieved beacon data and the facility map to the mobile device.

6. The method of claim 1, wherein iteratively determining an unfiltered location based on at least three received beacon signals, beacon location data retrieved from the database for the beacons from which the beacon signals were received, and application of the triangulation algorithm to the beacon location data includes:
   receiving the plurality of beacon signals from a plurality of beacon devices deployed at a facility, each beacon signal including a beacon identifier encoded therein and having a signal strength;
   retrieving beacon data from the database based on the beacon identifiers encoded in the received beacon signals, the beacon data including at least the beacon location data;
   applying the triangulation algorithm to the beacon location data of the retrieved beacon data to determine a location; and
   storing the location as an unfiltered location in a memory device with a current time.

7. A method performed by a mobile device comprising:
   iteratively determining unfiltered locations by:
   receiving at least three beacon signals from a plurality of beacon devices deployed at a facility, each beacon signal including a beacon identifier encoded therein and having a signal strength;

retrieving beacon data from a database based on the beacon identifiers encoded in the received beacon signals, the beacon data including at least geographic location data;

applying a triangulation algorithm to the geographic location data of the retrieved beacon data to determine a location; and storing the location as an unfiltered location in the memory of the mobile device with a current time;

iteratively determining filtered locations by:

calculating a location average and a standard deviation from a most recent number of determined unfiltered locations;

applying the triangulation algorithm to the most recent number of determined unfiltered locations that are less than the standard deviation from the calculated location average to obtain a filtered location; and storing the filtered location with a current time in the memory device; and iteratively generating a path prediction by:

applying a Kalman filter algorithm to a number of unfiltered locations to determine a path having a velocity and a direction over a path period equal in duration to a period over which the number of unfiltered locations were determined;

determining a distance variance from the path by the number of unfiltered locations from which the path was determined;

calculating the path prediction in the shape of a cone starting a distance behind a most recent filtered location and extending in the direction of the determined path for distance equal to a number of path periods multiplied by the velocity, and the cone having a width at an end of each path period equal to the distance variance multiplied by a number of elapsed path periods; and storing the path prediction in the memory of the mobile device.

8. The method of claim 7, wherein retrieving the beacon data further includes retrieving a beacon signal calibration multiplier from the database for each of the plurality of beacon devices from which beacon signals were received when a beacon signal calibration multiplier is present for a respective beacon device, and applying the beacon calibration multipliers to respective beacon signal strengths.

9. The method of claim 8, wherein the plurality of beacon signals are received from a mobile device as data representative of actual beacon signals received by the mobile device, the method further comprising:

transmitting at least one of the determined filtered locations and path predictions to the mobile device.

10. The method of claim 9, further comprising:

determining the mobile device is present at a facility based on data representative of a beacon signal received via a network from the mobile device;

retrieving beacon data from the database with regard to all beacons associated with a facility identifier included in a row of data in the database of associated with a beacon identifier included in the data representative of a beacon signal received from the mobile device;

retrieving a facility map associated with the facility identifier, the facility map including geographic location metadata corresponding to geographic location data of filtered and unfiltered locations; and transmitting the retrieved beacon data and the facility map to the mobile device.

11. The method of claim 7, updating a current position plotted on a map with the determined filtered locations.

12. The method of claim 7, wherein the most recent number of determined unfiltered locations from which the location average is calculated and the number of unfiltered location from which the path was determined is four (4).

13. The method of claim 7, wherein the distance behind the most recent filtered location where the cone of the path prediction begins is three (3) feet.

14. A system comprising:

at least one processor, at least one memory device, and at least one network interface device;

an unfiltered location determination module stored on the at least one memory device and executable by the at least one processor to perform data processing activities comprising:

receiving, via the at least one network interface device, data representative of at least three beacon signals from a plurality of beacon devices deployed at a facility, each beacon signal including a beacon identifier encoded therein and having a signal strength;

retrieving beacon data from a database based on the beacon identifiers encoded in the received beacon signals, the beacon data including at least geographic location data;

applying a triangulation algorithm to the geographic location data of the retrieved beacon data to determine a location; and storing the location as an unfiltered location in the at least one memory device;

a filtered location determination module stored on the at least one memory device and executable by the at least one processor to perform data processing activities comprising:

calculating a location average and a standard deviation from a most recent number of unfiltered locations retrieved from the at least one memory device;

applying the triangulation algorithm to the most recent number of unfiltered locations retrieved from the at least one memory device that are less than the standard deviation from the calculated location average to obtain a filtered location; and storing the filtered location with a current time in the at least one memory device;

a path prediction module stored on the at least one memory device and executable by the at least one processor to perform data processing activities comprising:

applying a Kalman filter algorithm to a number of unfiltered locations retrieved from the at least one memory device to determine a path having a velocity and a direction over a path period equal in duration to a period over which the number of unfiltered locations were determined;

determining a distance variance from the path by the number of unfiltered locations from which the path was determined;

calculating the path prediction in a configured shape starting a distance behind a most recent filtered location and extending in the direction of the determined path for a distance equal to a number of path periods multiplied by the velocity, and the shape having a width at an end of each path period equal to the distance variance multiplied by a number of elapsed path periods; and storing the path prediction in the at least one memory device.

15. The system of claim 14, wherein the configured shape is a cone.

16. The system of claim 14, wherein the filtered location determination module further transmits data representative of the filtered location via the at least one network interface device to a mobile device from which the unfiltered location determination module received the data representative of the beacon signals.

17. The system of claim 16, wherein the path prediction module further transmits data representative of the path prediction via the at least one network interface device to the mobile device from which the unfiltered location determination module received the data representative of the beacon signals.

18. The system of claim 17, further comprising a mobile device facility initialization module stored on the at least one memory device and executable by the at least one processor to perform data processing activities comprising:
  determining the mobile device is present at a facility based on data representative of a beacon signals received by the filtered location determination module;
  retrieving beacon data from the database with regard to at least some beacons associated with a facility identifier stored in the database in association with a beacon identifier included in the data representative of a beacon signal received from the mobile device;
  retrieving a facility map associated with the facility identifier, the facility map including geographic location metadata corresponding to geographic location data of filtered and unfiltered locations; and
  transmitting the retrieved beacon data and the facility map via the at least one network interface device to the mobile device.

19. The system of claim 14, wherein the filtered location determination module, when retrieving the beacon data further retrieves a beacon signal calibration multiplier from the database for each of the plurality of beacon devices from which beacon signals originated when a beacon signal calibration multiplier is present for a respective beacon device, the filtered location determination module further applying the beacon calibration multipliers to respective beacon signal strengths.

\* \* \* \* \*